United States Patent [19]

Sallée

[11] 4,096,740
[45] Jun. 27, 1978

[54] SURFACE ACOUSTIC WAVE STRAIN DETECTOR AND GAGE

[75] Inventor: Gary F. Sallée, Yorba Linda, Calif.

[73] Assignee: Rockwell International Corporation, El Segundo, Calif.

[21] Appl. No.: 479,961

[22] Filed: Jun. 17, 1974

[51] Int. Cl.² .................. G01B 7/16; G01N 29/00
[52] U.S. Cl. .................. 73/88.5 R; 73/597; 73/DIG. 4; 310/313
[58] Field of Search .............. 73/DIG. 4, 67.5, 67.6; 310/9.8; 331/107 A, 155

[56] References Cited

U.S. PATENT DOCUMENTS

| | | | |
|---|---|---|---|
| 1,912,213 | 5/1933 | Nicolson | 73/DIG. 4 X |
| 3,082,621 | 3/1963 | Soderholm | 73/88.5 R X |
| 3,233,466 | 2/1966 | Shaw, Jr. | 73/DIG. 4 X |
| 3,238,789 | 3/1966 | Erdley | 73/DIG. 4 X |
| 3,274,828 | 9/1966 | Pulvari | 73/DIG. 4 X |
| 3,340,726 | 9/1967 | Armstrong et al. | 73/133 R |
| 3,411,348 | 11/1968 | Schultheis, Jr. | 73/141 A |
| 3,572,109 | 3/1971 | Yerman | 73/517 R X |
| 3,575,050 | 4/1971 | Lynnworth | 73/67.5 R X |
| 3,766,496 | 10/1973 | Whitehouse | 310/9.8 X |
| 3,848,144 | 11/1974 | Schissler | 73/517 R X |
| 3,878,477 | 4/1975 | Dias et al. | 310/9.8 X |

Primary Examiner—Charles A. Ruehl
Attorney, Agent, or Firm—H. Fredrick Hamann; G. Donald Weber, Jr.; Robert Ochis

[57] ABSTRACT

A strain detector comprises an oscillator having a surface acoustic wave delay line as its frequency control element. The delay line is constructed on a substrate, such as quartz which is disposed to distort in response to the strain to be measured. Distortion of the substrate alters the frequency control characteristics of the surface acoustic wave delay line with a consequent change in oscillator frequency. The change in frequency is proportional to the distortion of the substrate. A strain gage employs the detector output frequency as the input signal to a frequency measuring system.

7 Claims, 4 Drawing Figures

SURFACE ACOUSTIC WAVE STRAIN DETECTOR AND GAGE

BACKGROUND OF THE INVENTION

1. Field of the Invention

This invention relates to the field of strain gages and more particularly to the field of precision force measuring devices.

2. Prior Art

Many prior art strain gages employ mechanical linkages and meters. Such gages can provide important information where the monitored strain induces large amplitude movement of the member being monitored. However, where only small amplitude movement is available to drive the gages, mechanical movements impair the accuracy of the measurement. A further problem with mechanical movement strain gages, is the difficulty of converting the mechanical movement to a format which is easily processed by modern information processing equipment.

Semiconductor strain gages are known, but have a limited dynamic range and accuracy.

SUMMARY OF THE INVENTION

A strain detector in accordance with this invention converts mechanical strain to variations in electrical signal frequency with a large dynamic range and high accuracy even for very small displacements. The frequency variation is produced through use of a surface acoustic wave delay line as the frequency control element of an oscillator. A surface acoustic wave delay line comprises a transducer deposited on a piezoelectric material such as quartz which is disposed so as to be deformed by strain in the member which is to be monitored. Deformation of the piezoelectric substrate changes the frequency control characteristics of the surface acoustic wave delay line, thereby changing the frequency of the oscillator. Consequently, the oscillator frequency change is a measure of the strain in the member being monitored.

DETAILED DESCRIPTION OF THE PREFERRED EMBODIMENT

Figure 1:
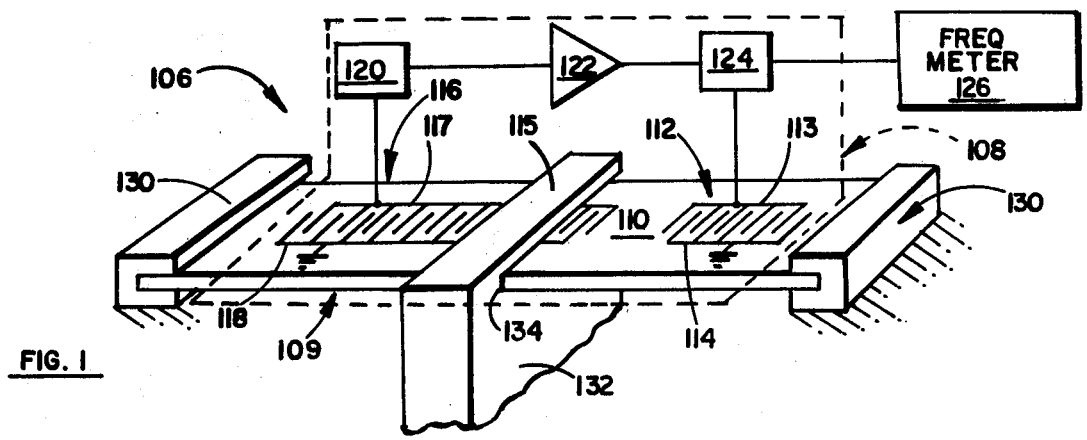
FIG. 1 illustrates a strain gage employing the strain detector of the invention disposed to be flexed by strain in the member to be monitored.

A preferred embodiment of a strain detector 108 in accordance with this invention is illustrated in FIG. 1 connected as a strain gage 106. Strain gage 106 comprises a frequency meter 126 and a strain detector or oscillator 108 employing a surface acoustic wave delay line 109 as a frequency control element. Surface acoustic wave delay line 109 in this preferred embodiment comprises two interdigitated surface acoustic wave transducers, input transducer 112 and output transducer 116 disposed on a surface-acoustic-wave active substrate 110 which is preferably single crystalline quartz. Input transducer 112 comprises two interdigitated electrodes 113 and 114. Electrode 114 is illustrated as being connected to a source of a reference potential such as ground. Output transducer 116 is similarly comprised of two interdigitated electrodes 117 and 118. Electrode 118 is illustrated as being connected to the source of reference potential such as ground. Electrode 117 of output transducer 116 is preferably connected to a tuning or alignment network 120. Tuning network 120 is connected between transducer 116 and an amplifier 122 when network 120 is needed in order to be able to adjust the phase angle of a feedback loop around amplifier 122 in which surface acoustic delay line 109 is the primary frequency control component. An output terminal of amplifier 122 is preferably connected to a power splitter 124. One output terminal of power splitter 124 is connected to electrode 113 of input transducer 112 of surface acoustic wave delay line 109 to provide a driving signal to the delay line. The other output terminal of power splitter 124 is connected to an input terminal of frequency meter 126 or some other appropriate device for monitoring the frequency of oscillation of oscillator 108. Oscillator 108 comprises surface acoustic wave delay line 109, alignment network 120, amplifier 122 and power splitter 124. It will be understood, that the alignment network 120 may be incorporated within the amplifier 122 or may be omitted where the amplifier characteristics did not require adjustment. Similarly, power splitter 124 may be omitted where the characteristics of delay line 109 and frequency meter 126 allow them to be connected in parallel to the output terminal of amplifier 122 or where other means are provided for extracting a signal to be applied to the frequency meter.

Electrodes 114 and 118 of delay line 109 are connected to ground because amplifier 122 employs ground voltage as its reference voltage. If amplifier 122 was designed to receive two non-ground inputs, electrodes 114 and 118 would be connected in an appropriate manner.

The frequency of oscillation of oscillator 108 is primarily controlled by the spacing of the interdigitated electrodes of the input and output transducers of the delay line 109 and by the surface acoustic wave velocity in the surface acoustic wave active material 110. Flexing, compressing or stretching the substrate 110 alters the characteristics of delay line 109 in such a way that the frequency of oscillation is modified in a predictable manner. Thus, if the substrate 110 is stretched or compressed in a longitudinal manner the frequency of oscillation of oscillator 108 will decrease or increase as a result of the crystal lattice and piezoelectric changes. If substrate 110 is flexed so as to bow the substrate, the direction of frequency shift will depend on whether the side of the substrate on which the transducers are deposited is bowed convex or concave. Where the transducer side of the substrate is bowed concave, the effect is essentially one of longitudinal compression of that side of the substrate. Similarly, if the transducer side of the substrate is bowed convex, the effect is essentially one of longitudinal stretching of that side of the substrate.

A pair of supports 130, support opposing longitudinal ends of substrate 110. A member 132 having an end 134 which is displaced by the strain which is to be monitored, is placed with end 134 in contact with substrate 110 to couple the motion of end 134 to substrate 110. Coupling preferably takes place at the longitudinal center of the substrate 110 in order to obtain maximum sensitivity. As the strain to be monitored varies, end 134 of member 132 will move back and forth in a direction perpendicular to the plane of the substrate, thereby flexing substrate 110. Where the end 134 of member 132 exerts only a pushing force on substrate 110 there is no need to affix end 134 to substrate 110. Where either both a pushing and a pulling force or just a pulling force is exerted at the end 134 of member 132, the end and 134 must be affixed in some manner to substrate 110. In the illustrated embodiment, member 132 is affixed to substrate 110 by placing substrate 110 in a slot in member 134 whereby both pushing and pulling motion of member 132 is coupled to substrate 110. However, other techniques can be employed if desired.

Figure 2:
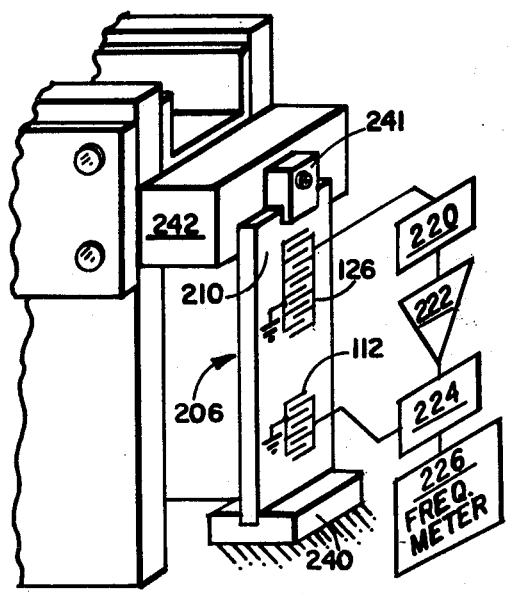
FIG. 2 illustrates another method of mounting a strain gage employing the strain detector of the invention for flexing in response to strain in the member to be monitored.

Another method of mounting the strain detector portion (208) of a strain gage 206 in accordance with this invention is illustrated in FIG. 2. The strain gage 206 itself is similar to that in FIG. 1, however, unlike the strain gage in FIG. 1 the strain gage in FIG. 2 is supported by a single support 240 and the strain transmitting member 242 is disposed to apply pressure to the unsupported or free end of the substrate 210 rather than to the middle of the substrate. Where it is desired to be able to apply both pushing and pulling forces to the end of substrate 210, a lip, slot or other appropriate means 241 may be provided to maintain substrate 210 in contact with member 242 during the application of pulling force. The response of the strain gage in FIG. 2 will differ from that in FIG. 1. First, for a given displacement of member 242 substrate 210 will flex only half as much as a similar displacement of member 132 will flex substrate 110 of the FIG. 1 embodiment. In each of the embodiments pushing force is applied to the back side of the substrate (that is the side which does have the transducer disposed thereon). Thus, secondly, pushing movement of member 132 in FIG. 1 will bow substrate 110 convex, whereas pushing movement of member 242 will bow substrate 210 concave. These opposite effects will usually cause the frequency of the oscillator to deviate in opposite directions, however, this depends on the cut of the substrate crystal.

Figure 3:
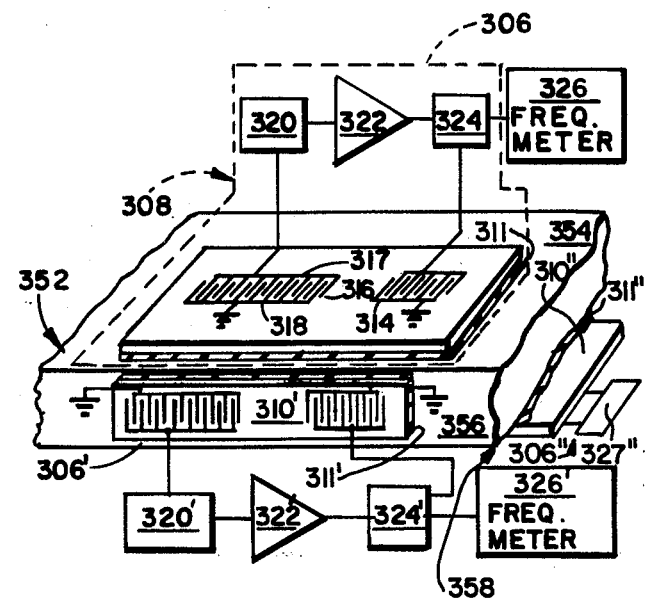
FIG. 3 illustrates the strain detector of the invention affixed directly to the member in which strain is to be monitored.

In FIG. 3, a preferred embodiment of a strain gage 306 in accordance with this invention is illustrated affixed directly to a member 352 whose strain is to be monitored. In this embodiment, substrate 310 must be firmly affixed to a face 354 of the member in a manner which causes substrate 310 to distort in a predictable manner as a result of strain in member 352. Substrate 310 can be affixed by an adhesive 311 or mechanical clamps, fasteners and the like (not shown) so long as the manner of affixing substrate 310 to member 352 is one which prevents the affixing means from distorting substrate 310 in an unpredictable manner.

The strain in member 352 may comprise stretching, contracting or flexing. Thus, strain in member 352 may compress, stretch or flex substrate 310. A single strain gage may not be able to resolve the difference between compression of member 352 and flexing of member 352 so as to increase the oscillator frequency because both effects may increase the oscillator frequency. By applying a second strain gage 306' to a face 356 of member 352, which is perpendicular to face 354, stretching, contracting and flexing movements of member 352 can be determined from the response of the two strain gages. However, an ambiguity may result from flexing of member 352 in the manner which causes the frequency of both strain gages to move in the same direction such as toward higher frequency. Such a change toward higher frequency could be the result of either uniform compression of member 352 and thus the substrate 310 and 310' or it could result from flexing of member 352 in a manner which causes both substrate 310 and 310' to be bowed concave. In order to eliminate this ambiguity, a third strain gage 306" having associated electronics 327 may be mounted on an opposing face 358 of member 352 which is opposite face 354 (or face 356). Electronics 327" comprise a tuning network similar to 320, an amplifier similar to 322, a power splitter similar to 324 and a frequency meter similar to 326; these components are not individually illustrated because of space limitations in the figure. With three strain gages as described, uniform compression or stretching of member 352 will result in the frequency deviation of each strain gage being in the same direction. However, where flexure of member 352 results in the frequency of two of the strain gages moving in the same direction, the third strain gage frequency will move in the opposite direction provided the individual gage characteristics are properly selected so that flexure in one direction causes the frequency to increase and flexure in the other direction causes the frequency to decrease. This is because with two strain gages mounted on opposing faces of member 352, any flexing movement of member 352 which bows one of the strain gages concave (thereby increasing its frequency) will bow the other convex (thereby reducing its frequency).

Figure 4:
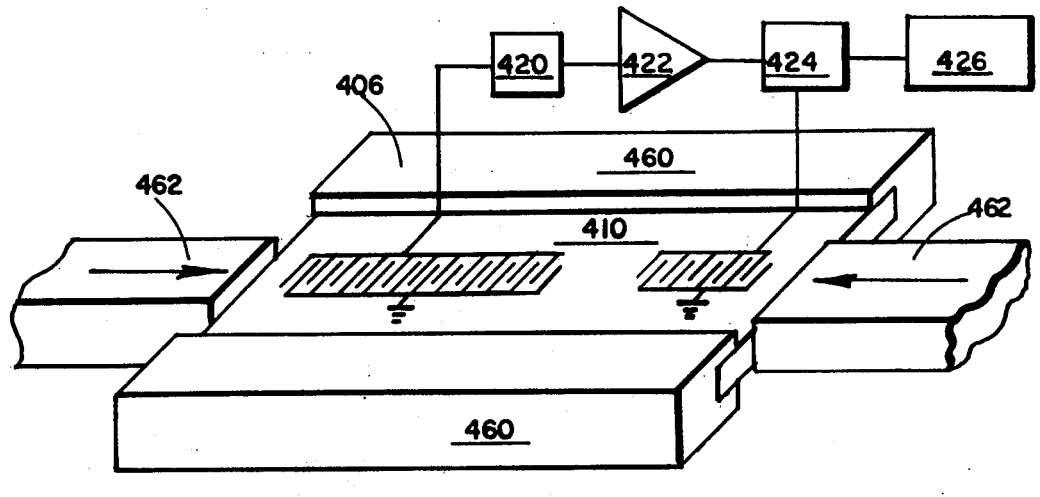
FIG. 4 illustrates the strain detector of the invention disposed to be compressed in response to strain in the member to be monitored.

An additional manner of mounting a strain gage in accordance with this invention is illustrated in FIG. 4. In this embodiment, compressional force is applied to the ends of substrate 410 by member 462 and substrate 410 is prevented from flexing longitudinally by being disposed in channels in support members 460. Under these conditions, compressional force applied by member 462 longitudinally compresses the substrate 410 thereby producing a change in the oscillator frequency.

The strain gage in each of the embodiments of FIGS. 1 through 4 operates in substantially the same manner, with only the interpretation of the results differing. The unstrained frequency of oscillation of the strain gage (106 in FIG. 1) is determined by energizing the strain gage when no distortion is applied to the substrate. This is most easily accomplished in the embodiment of FIG. 1 by energizing the strain gage prior to its insertion in the slot in member 132. With the strain gage energized, tuning network 120 may be adjusted as is appropriate to obtain a desired frequency of oscillation or a maximum output power. Thereafter, the strain responsive member, such as member 132, may be coupled to substrate 110. When member 132 is in a condition which will be used as a reference point for measuring strain, the mountings 130 of substrate 110 or member 132 as is appropriate to the configuration employed are adjusted so that the oscillator output frequency is at its unstrained value. Thereafter, any change in the frequency of the oscillator is the result of the strain to be monitored. Each of the other mounting embodiments may be calibrated in a similar fashion.

If it is desired to have the strain gage provide numerical values for strain in recognized units of measurement, a frequency meter should be employed which provides an output signal suitable for further processing. One way of providing the ability to provide measurements in standard units is to provide a frequency meter having a digital output and to calibrate the strain gage and provide computational circuitry to convert the frequency changes induced by strain into strain in standard units of measure.

An oscillator and surface acoustic wave delay line which may be employed in this invention is described and claimed in the patent application by Nandi et al entitled "Ultra High Frequency Single Mode Oscillator Controlled by a Surface Acoustic Wave Crystal," Ser. No. 407,695, filed Oct. 18, 1973, now U.S. Pat. No. 3,855,548 issued Dec. 17, 1974.

Preferred embodiments of the strain gage in accordance with the present invention have been illustrated and described. These embodiments are intended to be illustrative rather than limitive and those skilled in the art may be able, without departing from the scope of the invention as expressed in the appended claims, to modify these embodiments such as by increasing or decreasing the number of surface acoustic wave transducers and in other ways.

What is claimed is:

1. A strain detector comprising:
an oscillator including a distortable frequency control element comprising a piezoelectric substrate having surface acoustic wave transducer means disposed on a surface thereof,
said frequency control element having frequency control characteristics which vary upon distortion of the control element to vary the oscillation frequency of the oscillator; and
support means for mounting said frequency control element so that said element may be distorted by a strain which is to be monitored,
wherein said support means supports said frequency control element longitudinally so as to permit said frequency control element to be responsive to compressive strain without flexing.

2. A strain detector comprising:
a first oscillator including a first distortable frequency control element comprising first surface acoustic wave delay line means having frequency control characteristics which vary upon distortion of said first surface acoustic wave delay line means to vary the oscillation frequency of said first oscillator;
a second oscillator including a second distortable frequency control element comprising second surface acoustic wave delay line means having frequency control characteristics which vary upon distortion of said second surface acoustic wave delay line means to vary the oscillation frequency of said second oscillator;
a third oscillator including a third distortable frequency control element comprising third surface acoustic wave delay line means having frequency control characteristics which vary upon distortion of said third surface acoustic wave delay line means to vary the oscillation frequency of said third oscillator; and
support means for affixing said first surface acoustic wave delay line means to a surface of a member in which strain is to be monitored, for affixing said second surface acoustic wave delay line means to a different surface of said member than that to which said first surface acoustic wave delay line means is affixed and for affixing said third surface acoustic wave delay line means to a different surface of said member than those to which said first and said second surface acoustic wave delay line means are affixed, in order to permit variations in the oscillation frequency of said second oscillator different from the variations in the oscillation frequency of said first oscillator and variations in the oscillation frequency of said third oscillator different from the variations in the oscillation frequencies of said first and said second oscillators such that the differences in the frequency variations provide an unambiguous indication of the magnitude and direction of strain in said member.

3. A strain detector comprising:
a first oscillator including a first distortable frequency control element comprising first surface acoustic wave delay line means having frequency control characteristics which vary upon distortion of said first surface acoustic wave delay line means to vary the oscillation frequency of said first oscillator;
a second oscillator including a second distortable frequency control element comprising second surface acoustic wave delay line means having frequency control characteristics which vary upon distortion of said second surface acoustic wave delay line means to vary the oscillation frequency of said second oscillator;
a third oscillator including a third distortable frequency control element comprising third surface acoustic wave delay line means having frequency control characteristics which vary upon distortion of said third surface acoustic wave delay line means to vary the oscillation frequency of said third oscillator; and
support means for affixing said first surface acoustic wave delay line means to a first surface of a member in which strain is to be monitored so that said first surface acoustic wave delay line means may be distorted by a strain to be monitored, wherein said support means affixes said second surface acoustic wave delay line means to a second surface of said member, said second surface of said member being at an angle with respect to said first surface of said member in order to permit variations in the oscillation frequency of said second oscillator different from the variations in the oscillation frequency of said first oscillator, wherein said support means affixes said third surface acoustic wave delay line means to a third surface of said member, said third surface of said member being different from said first and said second surfaces of said member in order to permit variations in the oscillation frequency of said third oscillator different from the variations in the oscillation frequency of said first and said second oscillators, such that the differences in the frequency variations provide an unambiguous indication of the magnitude and direction of strain in said member.

4. A strain detector comprising:
a member subject to strain, said member having a first surface, a second surface distinct from said first surface and a third surface distinct from said first and said second surfaces;
a first oscillator;
a first distortable frequency control element included in said first oscillator and affixed to said first surface of said member so that said first frequency control element may be distorted by strain in said member;
a second oscillator;

a second distortable frequency control element included in said second oscillator and affixed to said second surface of said member so that said second frequency control element may be distorted by strain in said member;

a third oscillator;

a third distortable frequency control element included in said third oscillator and affixed to said third surface of said member so that said third frequency control element may be distorted by strain in said member;

each of said first, second and third frequency control elements comprising a distinct piezoelectric substrate, each substrate having surface acoustic wave transducer means disposed on a surface thereof;

each of said first, second and third frequency control elements having frequency control characteristics which vary upon distortion thereof to independently vary the oscillation frequency of each of said first, second and third oscillators, respectively; and frequency monitoring means responsive to changes in the oscillation frequencies of said first, second and third oscillators for indicating the magnitude and direction of the strain to which said member is subject.

5. The strain detector recited in claim 4 wherein said first surface of said member is spaced apart from and opposes said second surface of said member.

6. The strain detector recited in claim 4 wherein said first surface of said member is spaced apart from and substantially parallel to said second surface of said member.

7. The strain detector recited in claim 4 wherein said first surface of said member is at an angle with respect to said second surface of said member.

* * * * *